United States Patent

Affa et al.

[11] Patent Number: 4,549,354
[45] Date of Patent: Oct. 29, 1985

[54] MEASURING SYSTEM

[75] Inventors: Alfred Affa, Stein; Alfons Ernst, Traunreut, both of Fed. Rep. of Germany

[73] Assignee: Dr. Johannes Heidenhain GmbH, Traunreut, Fed. Rep. of Germany

[21] Appl. No.: 603,496

[22] Filed: Apr. 24, 1984

[30] Foreign Application Priority Data

May 3, 1983 [DE] Fed. Rep. of Germany ....... 3316081

[51] Int. Cl.$^4$ ............................................. G01B 11/04
[52] U.S. Cl. ................... 33/125 T; 33/125 R; 33/125 C
[58] Field of Search ............. 33/125 T, 125 R, 125 C, 33/125 A

[56] References Cited

U.S. PATENT DOCUMENTS 3,816,002  6/1974  Wieg ................................. 33/125 C
4,060,903 12/1977  Ernst ................................ 33/125 R
4,170,826 10/1979  Holstein ........................... 33/125 T

FOREIGN PATENT DOCUMENTS 3106701  2/1982  Fed. Rep. of Germany .

Primary Examiner—Willis Little
Attorney, Agent, or Firm—Willian Brinks Olds Hofer Gilson & Lione Ltd.

[57] ABSTRACT

A measuring system for measuring the relative position of tool machine parts compensates for thermally-induced length changes of a spindle stock by means of a scale carrier which acts as an expansion element for a scale. This scale carrier is fastened at one end directly via a fastening element to the spindle stock and at the other end is connected with an adjacent end of the scale, which is mounted on the scale carrier so as to be shiftable in the measuring direction. If the plane of the tool connected to the spindle stock shifts by an amount $\Delta c$ in the measuring direction X as a result of temperature rises of the spindle stock, the scale carrier, operating as an expansion element, acts to pivot a rotatable element having an adjustable lever ratio in order to shift the scale in the same direction. In this way, the entire thermally-conditioned displacement of the scale is also made to equal the amount $\Delta c$.

10 Claims, 3 Drawing Figures

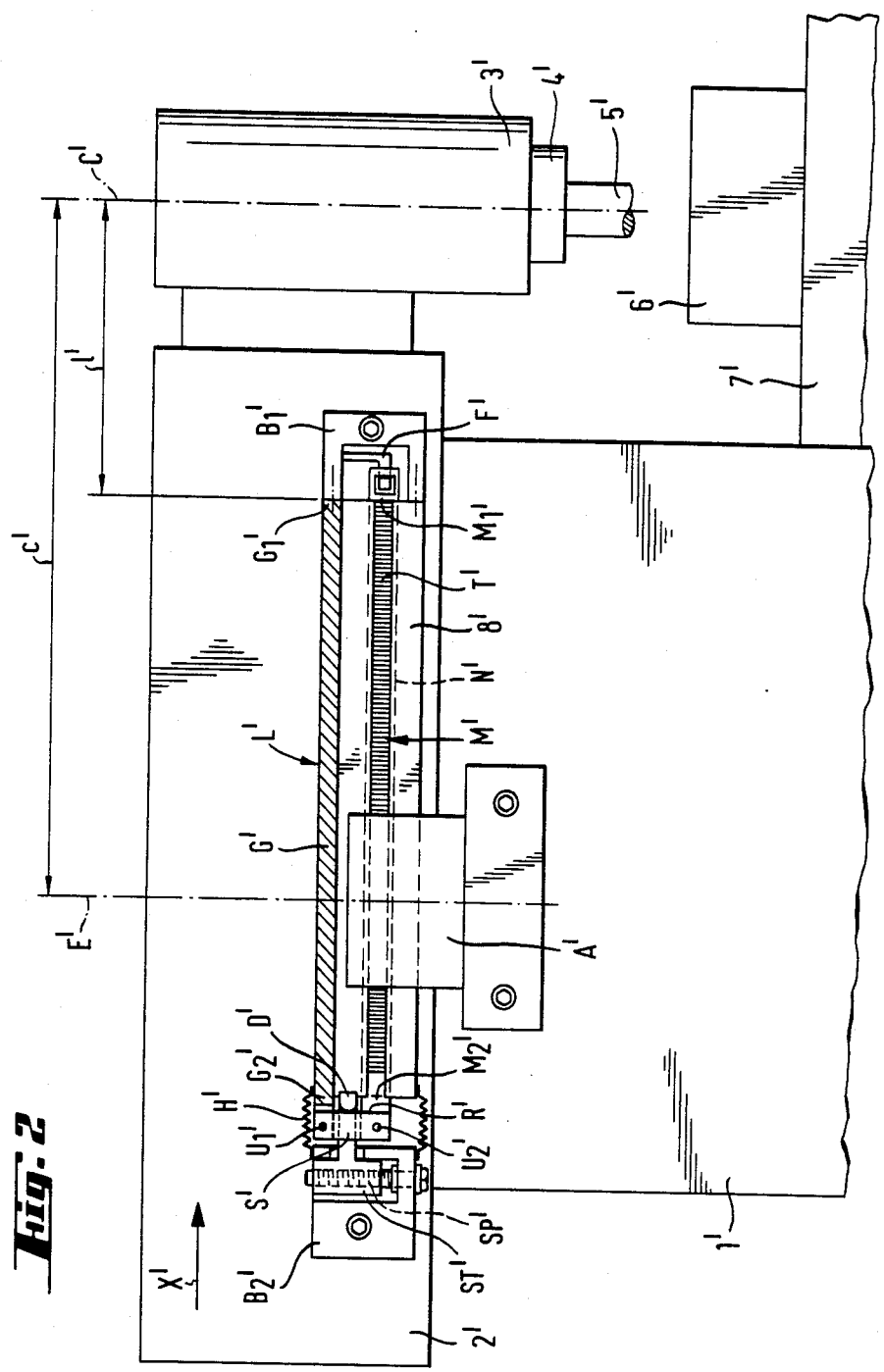

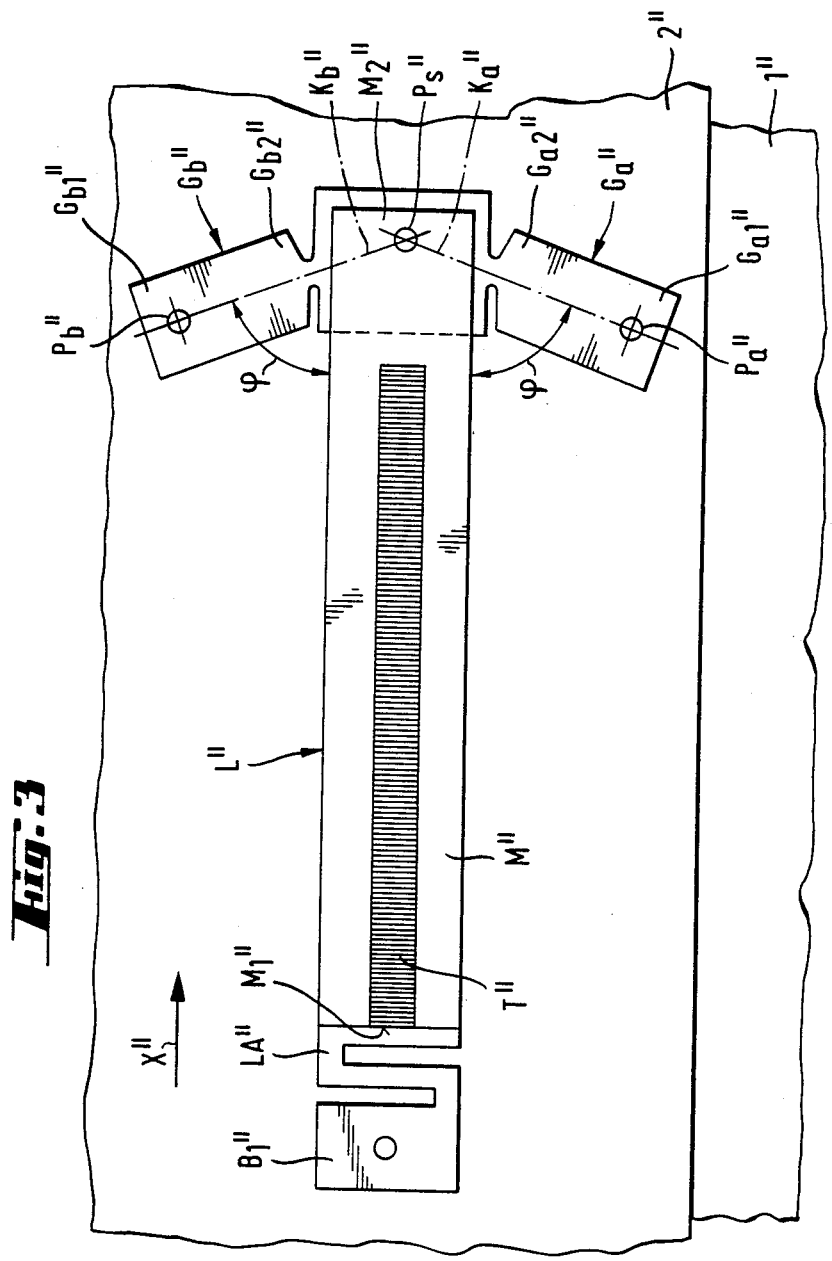

4,549,354

MEASURING SYSTEM

BACKGROUND OF THE INVENTION

The present invention relates to an improved system for compensating for thermal expansion for use with a measuring device of the type which includes a measuring scale connected to a first object, and a scanning unit connected to a second object and positioned to scan the scale to determine the position of the second object with respect to the first object.

Arrangements in measuring systems for machine tools for compensating for thermally-induced length changes of machine tool parts are known, for example, from German Patent DE-PS No. 31 06 701. The system disclosed in this patent includes an expansion bar formed of a material having a high coefficient of thermal expansion. This expansion bar is fastened at one end to a machine part and at the other end to a measuring scale. Thermal expansion of the expansion bar is equal to that of the machine tool part such that thermal expansion of the machine part is compensated for in the measuring system.

In this arrangement, the effective length of the expansion bar, as measured between the fastening points of the expansion bar to the machine part and to the scale, is determined by the magnitude of the thermally-induced length changes of the machine part. This preset effective length of the expansion bar is specific for the particular machine part for which is was made, and therefor the measuring system cannot be used with machine parts having other temperature characteristics without alteration to the measuring system.

BACKGROUND OF THE INVENTION

The present invention is directed to an improved measuring system of the general type described above which includes a system for compensating for thermally-induced length changes of machine parts having varying coefficients of thermal expansion.

According to this invention, a measuring device of the type described initially above is provided with at least one expansion element having a coefficient of thermal expansion which differs from that of the first object. This expansion element defines first and second ends. Means are provided for fastening the first end of the expansion element to the first object, and means are provided for connecting the second end of the expansion element to a scale such that the expansion element translates the scale to compensate for thermally-induced length changes to the first object. This connecting means comprises means for varying the ratio between translation of the second end of the at least one expansion element and translation of the scale caused by the at least one expansion element.

The present invention provides important advantages in that the measuring system of this invention can simply and readily be adapted to machine parts having differing temperature expansion characteristics. The measuring system can be widely applied to a variety of measuring devices because it can readily be adapted to provide length compensation for differing machine parts. Further advantageous features of the invention are set forth in the dependent claims.

The invention itself, together with further objects and attendant advantages, will best be understood by reference to the following detailed description, taken in conjunction with the accompanying drawings.

BRIEF DESCRIPTION OF THE DRAWINGS

FIG. 2 is a side view in partial section of a measuring system which incorporates a second preferred embodiment of this invention.

FIG. 3 is a plan view of portions of a measuring system which incorporates a third preferred embodiment of this invention.

DETAILED DESCRIPTION OF THE PRESENTLY PREFERRED EMBODIMENTS

Figure 1:
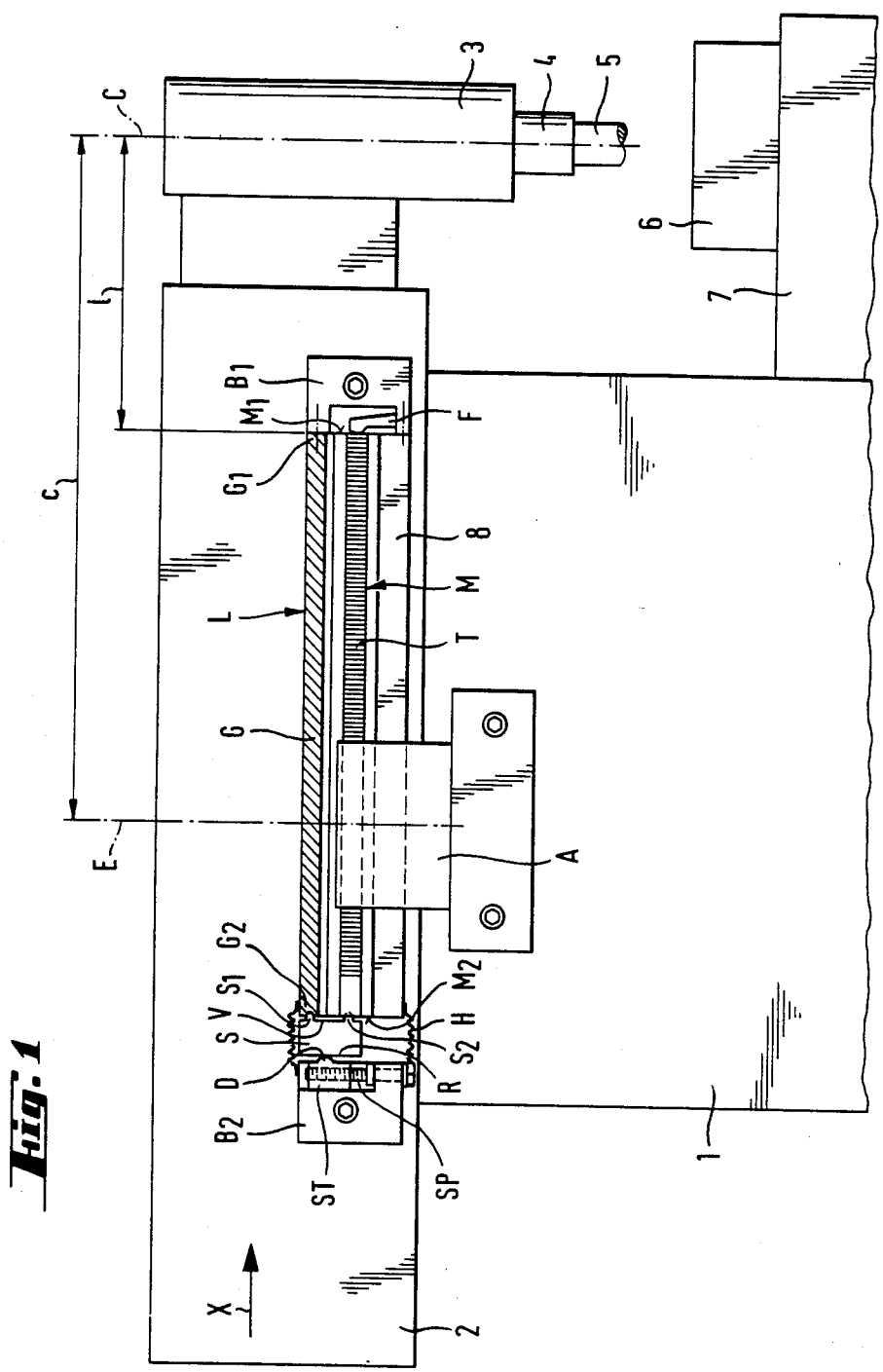
FIG. 1 is a side view in partial section of a measuring system which incorporates a first preferred embodiment of this invention.

Turning now to the drawings, FIG. 1 shows a milling machine which includes a machine bed 1. A spindle stock 2 is slideable horizontally in the X direction and guided by the machine bed 1. The spindle stock 2 defines at one end a milling head 3 having a vertical processing spindle 4. The spindle 4 mounts a tool 5 used to process a workpiece 6 positioned on a machine table 7. A length measuring system L is arranged on the spindle stock 2 in order to measure the relative position of the tool 5 with respect to the workpiece 6 in the X direction.

In such a machine tool, the spindle stock 2 is frequently at a higher temperature than ambient temperature. Such elevated temperatures of the spindle stock 2 can be caused for example by the drive, the gear, and the bearings of the spindle stock 2. Because the measuring system L is not mounted in the immediate vicinity of the tool 5, such temperature variations of the spindle stock 2 can cause the tool 5 to execute a slightly different relative movement in the X direction than that indicated by the length measuring system L.

The length measuring system L includes a scale carrier in the form of a housing G, in the interior of which there is fastened a scale M which defines a graduation T. The scale M is mounted to the housing G by means of an elastic adhesive layer (not shown) which permits a certain displacement of the scale M in the X direction (the measuring direction) relative to the housing G. The housing G is fastened by means of two fastening elements $B_1$, $B_2$ to the spindle stock 2, and the housing G defines a longitudinal slit 8 which is closed by sealing elements (not shown). A scanning unit A is fastened to the machine bed 1 and extends through the longitudinal slit 8 in order to scan the graduation T of the scale M by known means.

According to this invention, the housing G is connected at one end $G_1$ directly to the first fastening element $B_1$ for the compensation of thermally-induced length changes of the spindle stock 2 and thereby of thermally-induced displacements of the tool 5 relative to the workpiece 6. The other end $G_2$ of the housing G is fastened by means of a rotatable element S which is pivotably mounted to the second fastening element $B_2$ to contact an adjacent end $M_2$ of the scale M. The rotatable element S defines at a frontside V two projections $S_1$, $S_2$, which engage in correspondingly positioned recesses in the ends $G_2$, $M_2$ of the housing G and the scale M. The rotatable element S also defines a flat rearside R which is in contact with the projection D defined by an adjusting element ST. This adjusting element ST is slideable in the fastening element $B_2$ transversely to the measuring direction X in a guide defined by the fastening element $B_2$. The position of the adjusting element ST tranverse to the X direction is controlled by means of a spindle SP. The projection D serves as a pivot point for the rotatable element S. Displacement of the adjusting element ST by means of the spindle SP adjusts the lever ratio of the rotatable element S. That is, movement of the adjusting element ST adjusts the ratio of (1) the separation transverse to the measuring direction X between the projection D and the projection $S_1$ and (2) the separation transverse to the measuring direction X between the projection D and the projection $S_2$. Thus, by moving the adjusting element ST as appropriate, the rotatable element S can be adapted to provide the requisite compensation of thermally-induced length changes of the spindle stock 2 and therewith compensation of the thermally-conditioned displacement of the tool 5 relative to the workpiece 6. The fastening element $B_2$ is mounted on the spindle stock 2 in such a manner that it is joined free of play by means of the rotatable element S with both the housing G and the scale M. For encapsulation against dirt particles or other contaminants, a bellows H is arranged between the fastening element $B_2$ and the end $G_2$ of the housing G.

In the event of a temperature rise $\Delta T$ of the spindle stock 2 with respect to the machine bed 1 and the workpiece 6 during the operation of the milling machine, the distance c increases between the tool plane C of the tool 5 (the processing point) and the scanning plane E of the scanning unit A (the scanning point) by an amount $\Delta c$ in a positive X direction. The end $M_1$ of the scale M fastened to the fastening element $B_1$ is likewise displaced in a positive X direction by a smaller amount $\Delta c - \Delta l$, in which the distance $\Delta l$ represents the thermally-induced increase of the interval 1 between the end $M_1$ of the scale M and the tool plane C of the tool 5.

Since the housing G (which operates as an expansion element and is formed for example of aluminum) likewise undergoes a temperature change $\Delta T$, but at a substantially greater coefficient of thermal expansion than that of the spindle stock 2 (which is formed for example of gray cast iron), the end $G_2$ of the housing G shifts in a negative X direction relative to the pivot point D of the rotatable element S. When the lever ratio of the rotatable element S is appropriately adjusted by properly positioning the pivot point D transversely to the X direction, the scale M is shifted by an amount $\Delta l$ in a positive X direction by the expansion element G and the rotatable element S. Thus, when the tool 5 shifts by the amount $\Delta c$ with respect to the scanning plane E of the scanning unit A, the scale M is also shifted by an amount $\Delta c - \Delta l + \Delta l = \Delta c$ with respect to the scanning plane E. Because the scale M is displaced by an amount $\Delta c$ in a positive X direction, the tool plane C of the tool 5 as measured by the measuring system L is back displaced by an amount $\Delta c$ in a negative X direction. For this reason, thermally-induced length changes of the spindle stock 2 have no adverse effect on processing accuracy. The resetting force for the scale M is provided by means of the elastic adhesive layer.

The above statements hold, strictly speaking, only in the event the scale M is formed of a material having a negligibly low coefficient of thermal expansion. For example, the above statements are accurate when the scale M is formed of quartz glass or invar. However, in the event the scale M is formed of a material having a finite coefficient of thermal expansion, the corresponding length change of the scale M must be taken into account by a correction of the lever ratio of the rotatable element S. In the event the scale M is formed of such a material having a finite coefficient of thermal expansion, it is also possible to act on the end $M_1$ of the scale M with a spring F correspondingly dimensioned acting in the negative X direction. In this event the scale M is shifted not only by the distance $\Delta l$ in the positive X direction, but additionally is upset or compressed in order to compensate for length changes of the scale M itself induced by heating of the scale M by the temperature $\Delta T$. The spring constant of the spring F should preferably be made adjustable in a manner not shown to allow the measuring system to be tailored for the particular machine on which it is mounted.

FIG. 2 represents a milling machine having a length measuring system L', in which similar elements are referenced by the same reference symbols as those used in FIG. 1, but with a prime symbol.

The length measuring system L' includes a scale carrier in the form of a housing G', in the interior of which a measuring band M' which defines a graduation T' is mounted so as to be slideable in a groove N' in the X' direction (measuring direction) relative to the housing G'. The housing G' is fastened via two fastening elements $B_1'$, $B_2'$ to a spindle stock 2', and the housing G' defines a longitudinal slit 8' which is closed by sealing elements (not shown). A scanning unit A' is fastened to a machine bed 1' to extend through the longitudinal slit 8' in order to scan the graduation T' of the measuring band M' in a known manner. In order to compensate for thermally-induced length changes of the spindle stock 2' and thereby for thermally-induced displacements of the tool 5' relative to the workpiece 6', the housing G' is connected with one end $G_1'$ directly with the first fastening element $B_1'$, and with the other end $G_2'$ by means of a rotatable element S'. This rotatable element S' is mounted in the second fastening element $B_2'$ and is coupled both to the other end $G_2'$ of the housing $G_2$ and to the adjacent end $M_2'$ of the measuring band M', in each case by means of a respective joint $U_1'$, $U_2'$. This rotatable element S' defines a flat backside R' facing the measuring band M', which backside R' is in contact with a projection D' defined by an adjusting element ST'. This adjusting element ST' is slideable transversely to the measuring direction X' in a guide defined by the fastening element $B_2'$. A spindle SP' serves to locate the adjusting element ST' transversely to the measuring direction X'.

This projection D' serves as a pivot point for the rotatable element S' and permits an adjustment in the lever ratio of the rotatable element S' via displacement of the adjustable element ST' by means of the spindle SP'. By appropriately adjusting this lever ratio the thermally-induced length changes of the spindle stock 2' and thereby thermally-induced displacement of the tool 5' relative to the workpiece 6' can be compensated. The other end $M_1'$ of the scale M' is mounted by means of a tension spring F' to the fastening element $B_1'$. The other fastening element $B_2'$ is mounted to the spindle stock 2' in such a way that it is connected without play by means of the rotatable element S' with both the housing G' and the measuring band M'. A bellows H' is mounted between the fastening element $B_2'$ and the end $G_2'$ of the housing G' in order to encapsulate the measuring system L' with respect to dirt particles and other contamination.

In the event of a temperature rise $\Delta T$ of the spindle stock 2' with respect to the machine bed 1' and the workpiece 6', the distance c' increases between the tool plane C' of the tool 5' and the scanning plane E' of the scanning unit A' by the amount Δc' in the positive X' direction. The other end M₁' of the measuring band M' situated on the fastening element B₁' is likewise shifted in a positive X' direction only by the amount Δc'−Δl', the amount Δl' representing the thermally-induced increase of the interval l' between the end M₁ of the measuring band M' and the tool plane C' of the tool 5'.

The housing G' acts as an expansion element and is characterized by a substantially greater coefficient of thermal expansion than that of the spindle stock 2'. The housing G' likewise undergoes a temperature rise equal to ΔT, and the end G₂' of the housing G' shifts in the negative X' direction relative to the pivot point D' of the rotatable element S', so that when the lever ratio is properly adjusted by shifting the pivot point D' transversely to the X' direction, the measuring band M' is shifted by the amount Δl' in the positive X' direction. The tension spring F' cooperates in this shift of the measuring band M', and the spring constant of the spring F' is chosen in such a way that the original length of the measuring band M' is preserved in the event of such displacement. On a displacement of the tool 5' by the amount Δc' with respect to the scanning plane E' of the scanning unit A', the measuring band M' shifts by the amount Δc'−Δl'+Δl'=Δc' with respect to the scanning plane E'. With this arrangement there is required for optimum accuracy a measuring band M' of a material such as invar having a negligibly low coefficient of thermal expansion. In the event of a measuring band M' having a finite coefficient of thermal expansion, the corresponding thermally-induced length changes of the measuring band M' must be taken into account and adjusted by appropriate correction of the lever ratio of the rotatable element S'.

If the measuring band M' is formed of a material having a finite coefficient of thermal expansion, thermally-induced length changes of the measuring band M' itself can be compensated by manufacturing the measuring band M' at a length shorter than that corresponding to its true measuring length, i.e., with a grid constant of the graduation T' reduced with respect to the desired final grid constant. This shortened measuring band M' is expanded in the length measuring instrument L' by means of the spring F' to the correct measuring length at the reference temperature, for example the ambient temperature or the temperature of the workpiece 6'. In the event the spindle stock 2' and thereby the housing G' heat by the temperature amount ΔT, the measuring band M' is shifted not only by the amount Δl' in the positive X' direction, but it also undergoes through the correspondingly dimensioned spring F' a reduction in length or an upsetting caused by the length increase of the scale M' in order to compensate for the temperature change ΔT. For this purpose, the spring F' defines a spring characteristic curve which reduces the pulling tension applied to the measuring band M' requisite for the stretching of the band M' to such a degree that the length change evoked by the temperature increase ΔT is again cancelled. In this way, the original measuring length of the measuring band M' is constantly preserved in the face of temperature changes. Preferably, the spring constant of the spring F' should be made adjustable in a manner not shown in order to allow the spring F' to be tailored for machine specific applications.

FIG. 3 shows a partial view of a milling machine on which is mounted a length measuring system L" which incorporates a third preferred embodiment of this invention. In FIG. 3 elements similar to elements of FIGS. 1 and 2 are provided with the same reference symbols, but twice primed.

The length measuring system L" includes a scale M" which defines a graduation T"'. The scale M" is fastened at one end M₁" by means of a fastening element B₁" to a spindle stock 2". The fastening element B₁" defines a meander form length compensating element LA"', which is directly connected with the scale M" and permits a shifting of the scale M" in the X" direction relative to the spindle stock 2". A scanning unit (not shown) is fastened to the machine bed 1" to scan the graduation T" of the scale M".

For the compensation of thermally-induced length changes of the spindle stock 2" and thereby of thermally-induced displacements of a tool relative to a workpiece, two expansion elements $G_a"$, $G_b"$ are fastened at one end $G_{a1}"$, $G_{b1}"$ by means of respective fastening points $P_a"$, $P_b"$ to the spindle stock 2". The other ends $G_{a2}"$, $G_{b2}"$ of the expansion elements $G_a"$, $G_b"$ are connected to the other end $M_2"$ of the scale M" by means of respective joints $K_a"$, $K_b"$ and a fastening point $P_s"$. In this embodiment the joints $K_a"$, $K_b"$ are formed by cross-sectional narrowings or constrictions in a single plate, formed for example of aluminum, which is arranged at one end $M_2"$ of the scale M". The two expansion elements $G_a"$, $G_b"$ are integrally formed of this plate and are both inclined at an angle $\phi$ with respect to the X" direction.

In the event of a temperature rise ΔT of the spindle stock 2" with respect to the machine bed 1" and the workpiece, the distance between the tool plane of the tool and the scanning plane of the scanning unit increases by an amount Δc" in the positive X" direction. The expansion elements $G_a"$, $G_b"$ have a greater coefficient of thermal expansion than that of the spindle stock 2", and the expansion elements $G_a"$, $G_b"$ likewise undergo a temperature rise and a concomitant thermally-induced length change. Through the arrangement of the expansion elements $G_a"$, $G_b"$ at an angle $\phi$ with respect to the X" direction, the end $M_2"$ of the scale M" is deflected or translated in the X" direction by a greater amount than the thermally-induced length change of the expansion elements $G_a"$, $G_b"$. Because of their inclined arrangement, the expansion elements $G_a"$, $G_b"$ cooperate to act as a translation element. The translation ratio between translation of the expansion elements $G_a"$, $G_b"$ and resulting translation of the scale M" can be adjusted by adjusting the angle $\phi$ in such a way that the entire thermally-induced displacement of the scale M" with respect to the scanning plane of the scanning unit is made equal to the amount Δc".

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

I claim:

1. In a measuring device of the type comprising a measuring scale connected to a first object, a scanning unit connected to a second object and positioned to scan the scale to determine the position of the second object with respect to the first object, the improvement comprising:

at least one expansion element defining first and second ends;

means for rigidly fastening the first end of the at least one expansion element to the first object;

means for mounting the scale on the first object such that the scale is shiftable with respect to the first object along a measuring direction; and means for connecting the second end of the at least one expansion element to the scale such that the at least one expansion element translates the scale with respect to the first object along the measuring direction to compensate for thermal length changes of the first object, said connecting means comprising means for varying the ratio between translation of the second end of the at least one expansion element and translation of the scale caused by the at least one expansion element.

2. The invention of claim 1 wherein the scale is mounted on the expansion element such that the expansion element operates as a scale carrier and the scale is shiftable on the expansion element along a measuring direction; wherein the fastening means comprises a first fastening element secured both to the first object and to the first end of the expansion element; and wherein the connecting means comprises a second fastening element and a rotatable element pivotably mounted on the second fastening element so as to bear on both the second end of the expansion element and the scale, such that pivoting of the rotatable element by the expansion element translates the scale with respect to the expansion element.

3. The invention of claim 2 wherein the rotatable element defines a flat face; and wherein the connecting means further comprises an adjusting member which defines a projection, and a spindle which connects the adjusting member to the second fastening element and moves the adjusting member transversely with respect to the measuring direction; said projection positioned to contact the flat face of the rotatable element to define a pivot axis therefor such that movement of the adjusting member by the spindle adjusts the ratio between translation of the second end of the expansion element and translation of the scale caused by the expansion element.

4. The invention of claim 2 further comprising means for applying compressive forces to the scale.

5. The invention of claim 2 further comprising means for applying stretching forces to the scale.

6. The invention of claim 4 wherein the means for applying compressive forces comprises an adjustable spring.

7. The invention of claim 5 wherein the means for applying stretching forces comprises an adjustable spring.

8. The invention of claim 1 wherein the at least one expansion element comprises two expansion elements, each defining respective first and second ends; wherein the fastening means fastens the first ends of both of the expansion elements to the first object; and wherein the connecting means connects the second ends of both of the expansion elements to the scale via a respective joint such that each of the expansion elements is oriented at an angle $\phi$ with respect to a measuring direction defined by the scale and the expansion elements cooperate to translate the scale to compensate for thermal length changes of the first object.

9. The invention of claim 8 wherein the two expansion elements are formed together as one piece of material, and wherein the joints are defined by narrowed constrictions of the one piece of material.

10. The invention of claim 1 wherein the at least one expansion element has a coefficient of thermal expansion which differs from that of the first object.

* * * * *

UNITED STATES PATENT AND TRADEMARK OFFICE
CERTIFICATE OF CORRECTION

PATENT NO. : 4,549,354

DATED : Oct. 29, 1985

INVENTOR(S) : Alfred Affa et al.

It is certified that error appears in the above-identified patent and that said Letters Patent is hereby corrected as shown below:

<u>IN THE CLAIMS</u>

In Claim 2 (column 7, line 18), please delete the reference to "claim 1" and refer instead to --claim 10--.

Signed and Sealed this

Tenth Day of May, 1988

*Attest:*

DONALD J. QUIGG

*Attesting Officer*      *Commissioner of Patents and Trademarks*